US005534100A

United States Patent [19]

Mitchell

[11] Patent Number: 5,534,100
[45] Date of Patent: Jul. 9, 1996

[54] PORTABLE METHOD AND APPARATUS FOR THE APPLICATION OF A FLOCK MATERIAL GRAPHIC TO A FABRIC SURFACE

[76] Inventor: Larry Mitchell, 5720 McKinley Dr., Garden Valley, Calif. 95633

[21] Appl. No.: 300,321

[22] Filed: Sep. 2, 1994

[51] Int. Cl.$^6$ ...................................................... B44C 1/16
[52] U.S. Cl. .......................... 156/230; 156/235; 156/240; 156/289; 156/71
[58] Field of Search ....................... 156/230, 235, 156/240, 241, 247, 289, 62, 62.3, 94, 71; 428/31

[56] References Cited

U.S. PATENT DOCUMENTS

| | | | |
|---|---|---|---|
| 2,517,389 | 10/1946 | Dow et al. | 156/230 X |
| 2,855,338 | 10/1958 | Mulkey | 156/94 X |
| 3,822,144 | 7/1974 | Taylor | 156/94 X |
| 3,956,552 | 5/1976 | Geary | 156/285 X |
| 4,061,516 | 12/1977 | George et al. | 156/94 |
| 4,142,929 | 3/1979 | Otomine et al. | 156/230 X |
| 4,201,810 | 5/1980 | Higashiguchi | 156/230 X |
| 4,314,813 | 2/1982 | Masaki | 156/240 X |
| 4,564,406 | 1/1986 | Binks | 156/289 |
| 4,597,812 | 7/1986 | Hamilton | 156/63 |
| 4,741,791 | 5/1988 | Howard | 156/237 X |
| 5,047,103 | 9/1991 | Abrams et al. | 156/241 X |

*Primary Examiner*—David A. Simmons
*Assistant Examiner*—Steven J. Helmer
*Attorney, Agent, or Firm*—Malin, Haley, DiMaggio & Crosby

[57] ABSTRACT

A method and tool applicator for applying a heat transfer flock material portably to cloth surface such as automobile seats to allow the use of logos, letters, numbers, and any graphic design to be portably placed without having to remove the material from its present location without having to apply great pressure. The invention includes applying heat through a thermal barrier that protects the seat and the device from excessive heat with a hand-held tool for a predetermined amount of time, which allows the adhesive on the flock material to bond with the seat fabric.

2 Claims, 2 Drawing Sheets

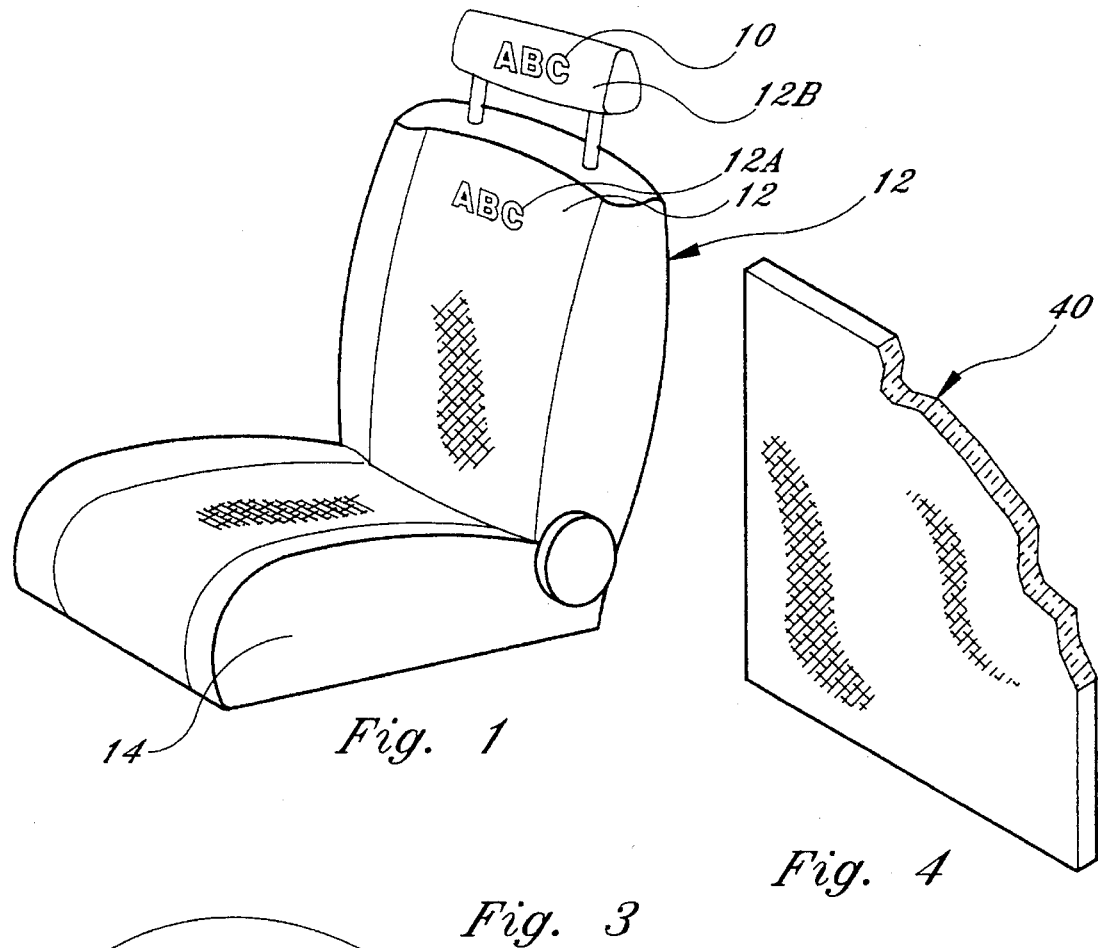
Fig. 1
Fig. 4
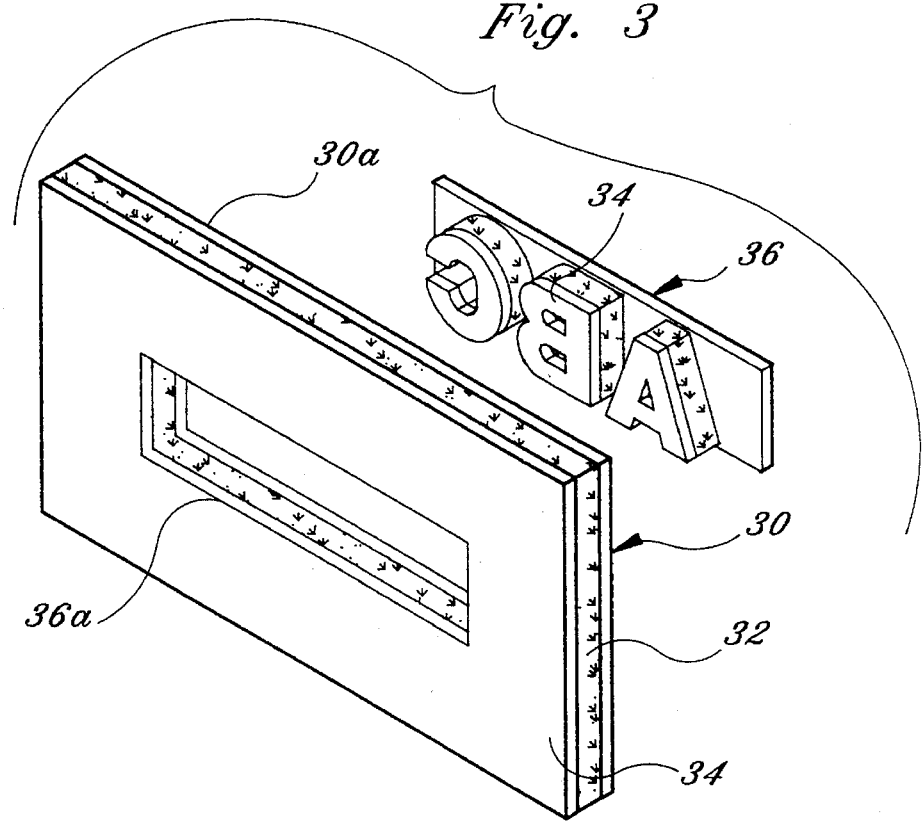
Fig. 3

PORTABLE METHOD AND APPARATUS FOR THE APPLICATION OF A FLOCK MATERIAL GRAPHIC TO A FABRIC SURFACE

BACKGROUND OF THE INVENTION

1. Field of the Invention

This invention relates generally to a method and apparatus which can be used on site to provide a permanent heat transfer between a flock material and a cloth surface for applying graphics thereto, and specifically, to a method and apparatus that is portable and allows one to apply flock material graphic designs to automobile seats, truck seats, upholstery, or other on site applications.

2. Description of the Prior Art

The affixing of decorative graphics such as letters or logos to fabric or cloth surfaces is well known. Typically, the graphic can be sewn on if the fabric surface can be fed into a sewing machine. Often it is desirous to attach a graphic display that shows a personal logo or name in order to customize automobile seats in one's car. Heretofore, the permanent application of such a graphic has been a complex problem requiring that the vehicle seat be removed from the vehicle and transferred to an operational site where high pressure applicators are used to transfer the graphic onto the cloth, upholstery surface. This is a costly and time consuming process.

It is known to attach labels with a hand-held label attaching iron, such as shown in U.S. Pat. No. 3,793,112, issued Feb. 19, 1974 to Sontag et al. This is used to attach manufacturers' identification labels to garments. U.S. Pat. No. 4,351,871, issued Sep. 28, 1982 to Lewis et al. discloses a method for decorating textile fabrics which includes a thin, removable layer based on thermoplastic polymer films under the action of heat and pressure. This method shows a transfer of dyes to the fabric. U.S. Pat. No. 4,037,008 issued Jul. 19, 1977 to Tugwell shows a transfer printing process involving heat and pressure transfer. U.S. Pat. No. 4,342,614 issued Aug. 3, 1982 to Vanden Bergh shows a pressure applicator for graphics transfer that is a hand-held device that applies a roller pressure on tape surfaces.

None of the devices in the prior art show a method and device for permanently applying and affixing a fabric tufted flock material, cut in a graphic design, to a cloth surface such as an automobile seat that can be done quickly and efficiently on site and without the application of extreme pressure and with the use of a small, hand-held tool. Using the present invention, the heat transfer flock material can be readily precut to any graphic design from a standard sheet of material and applied on location by the applicator permanently to a cloth surface.

SUMMARY OF THE INVENTION

A method and heat applying apparatus that provides for applying a flock material to a cloth surface on site that includes the steps of selecting a cloth surface such as an automobile seat cover, preparing the cloth surface for the application of a heat transfer flock material, cutting out a predetermined design forming a graphic in a heat transfer flock material, affixing the heat transfer flock material graphic design to the cloth surface temporarily with a plurality of removable connectors such as straight pins, heating a tool surface having a predetermined shape, size, and heat application area to between 350° and 380°, placing a flexible partial thermal barrier over the flock material graphic design pinned in place and surrounding fabric surface, and applying with the heating tool surface a uniform heat to the flock material surface through the partial thermal barrier for a predetermined time period, which allows adhesive fusion of the flock material to the cloth surface. The attachment between the flock material graphic design and the fabric surface is permanent.

Once the heat transfer graphic application has taken place, the pins may be removed and the entire flock material brushed. The edges of the flock material may additionally be heat sealed if necessary for continuous visual contour to insure that the entire graphic is totally affixed (no loose edges).

The heating tool used with the present invention includes a heat transferring, flat, heat conductive metallic surface of a predetermined size and shape, a hand-held handle made of wood that is not conductive to heat, and an electric heating element mounted inside with the heating tool surface a housing that includes a ceramic barrier and a shroud around the heating element, the metallic heat transfer surface being at one end of the housing opposite the handle. The heating tool also includes a floor stand so that once the tool end is heated, the tool can be temporarily placed in a safe position to prevent inadvertent contact with the heat transfer plate.

The heat transfer flock material that constitutes the transfer graphic comes originally in rolls and includes tufted fibers held together by an adhesive on one side and covered by a release liner (a 5 mil. polyester clear sheet that can be removed once the flock material is attached) on the opposite side. A small piece of the heat transfer flock material initially is cut from the roll. The material piece is formed into the graphic by a fabric cutting machine that cuts through the material and adhesive and can be controlled to provide a unique shape, peripheral design, letters, and numbers of the flock. The cutting operation of the graphic can be done on a computerized machine that is programmed for graphic design cut. The adhesive remains on one side of the flock design and the release liner on the opposite side.

The purpose of the invention is to provide a method and apparatus that can be used for applying a flock material graphic permanently to any type of cloth surface. Portable use is one of the primary advantages of the invention. A cloth surface, regardless of location, whether an automobile seat, furniture, or fabric surface at any location, can be portably served by using the method and apparatus described herein. The fabric surface receiving the design can be made from natural or synthetic materials, including cotton, polyester, rayon, or nylon, as long as the surface has a textured weave which allows the adhesive on the flock graphic design to melt and flow into the textured surface when the fabric material is hot.

Applicant has found that when using the method herein, it is best to clean the surface area where the flock graphic will be applied with a solvent such as trichloroethane.

Another important step of the method is to include the use of a shield material that is a 3 mil. teflon glass mesh to protect the fabric surface area and the flock material from overheat or heat damage.

The hand-held tool which is used to provide the heat transfer also allows the end of the tool to be used for spot focusing if there are any loose edges around the entire graphic after it has been applied and inspected.

The final step is to provide a brush with a ¾ inch bristle to brush the texture and nap detail of both the graphic and the seat fabric.

Thus, through the use of the method and the tool described herein, a flock material graphic can be quickly, yet permanently applied in minutes in any location (portably) to a fabric surface quickly, efficiently, and cost-effectively.

It is an object of this invention to provide an improved method for permanently attaching heat transfer flock material to a fabric surface regardless of the fabric surface location.

It is another object of this invention to provide an improved heat transfer tool that is used with a heat transfer flock material to attach a decorative graphic to a fabric surface such as an automobile seat without having to remove the fabric of the automobile seat for application.

And yet another object of this invention is to provide a convenient, portably usable method and apparatus for applying heat transfer flock material formed in custom made graphic designs to any type of cloth or textured weave surface in any location in a matter of minutes.

And yet still another object of this invention is to provide a portable process for applying cloth graphics to a cloth surface, regardless of the-location.

In accordance with these and other objects which will become apparent hereinafter, the instant invention will now be described with particular reference to the accompanying drawings.

BRIEF DESCRIPTION OF THE DRAWINGS

FIG. 1 shows a perspective view of an automobile seat having a flock material attached thereto in accordance with the present invention.

FIG. 3 shows a perspective view as an example of heat transfer flock material used in the present invention and a cut away rectangular graphic for transfer onto a fabric surface.

FIG. 4 shows a perspective view of a flexible heat shield made of teflon glass mesh, used in the application of the flock material.

DESCRIPTION OF THE PREFERRED EMBODIMENTS

Figure 2:
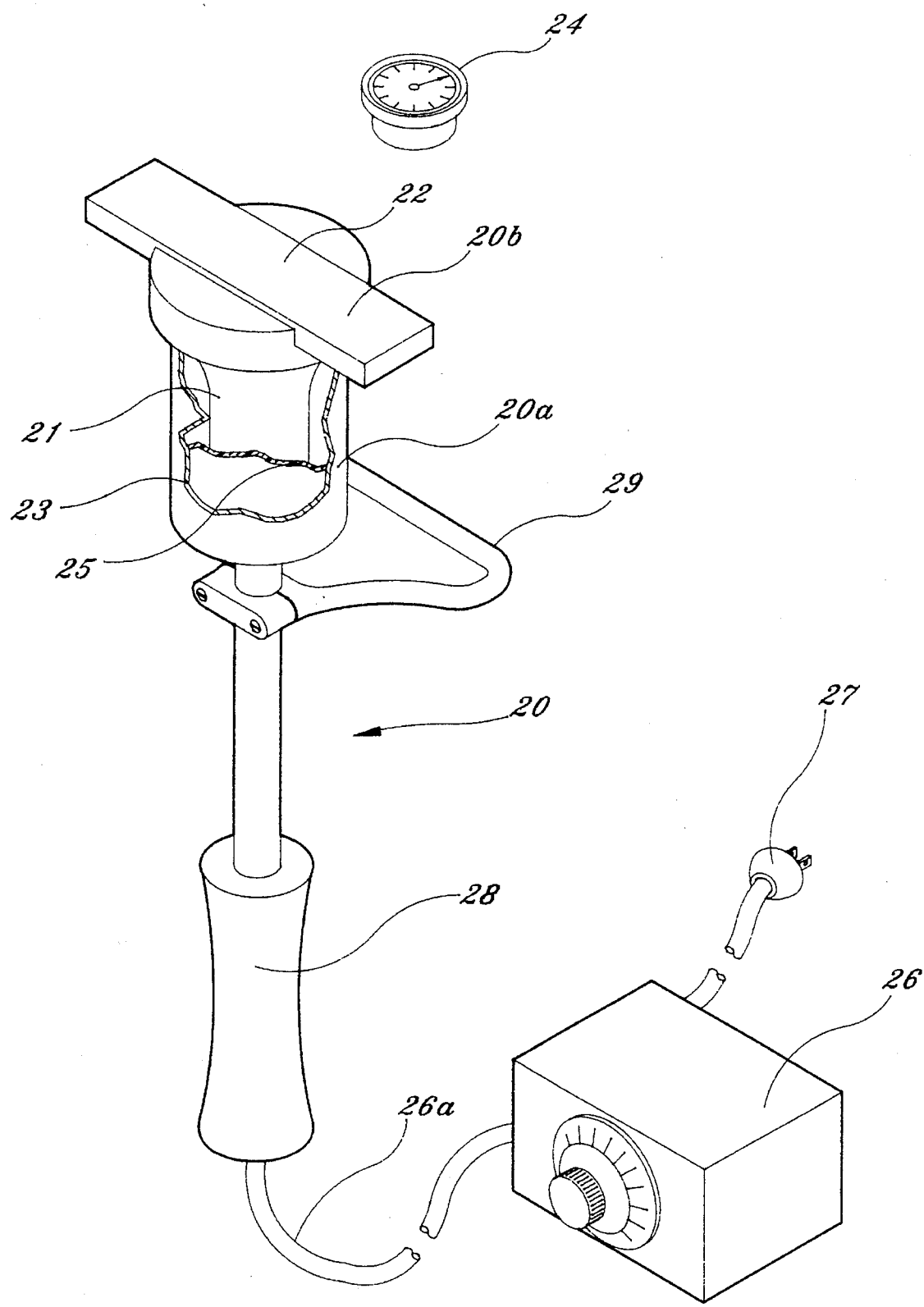
FIG. 2 shows a perspective view, partially cut away, showing a heat transfer device using the present invention.

Referring now to FIG. 1, a graphic design made of a flock material 10 displaying the letters "ABC" is shown permanently attached to a fabric surface and headrest 12b represented as an upper portion of a car seat 12, including a lower section 14 of the car seat. The significance of the flock material design 10 permanently affixed to the upper car seat fabric surface 12a and 12b is that the car seat fabric surface 12a and headrest 12b did not have to be removed from the car seat, nor did the car seat have to be removed from the car. The flock material design 10 can be applied to the fabric surface as long as the car is in a location having a conventional electrical AC supply (110 volt). The car seat remains in the vehicle. Such a graphic design application operation can be done in a few minutes.

The method used to apply the graphic design 10 comprised of a heat transfer flock material is accomplished as described below. The initial heat transfer flock material 30 (FIG. 3) is a conventionally made material that comes in rolls and includes a fibrous flock layer 32, a meltable adhesive layer 34, and a visually clear release liner 30a. The release liner 30a is typically a 5 mil. polyester, clear sheet that covers one side of the flock (fibrous) layer 32 as a protective cover; the opposite includes an adhesive layer 34 that will be heat transferred to the fabric surface as disclosed herein. At room temperature and until heated the proper amount, the adhesive layer is essentially in a solid form and is not tacky or sticky.

Referring to FIG. 3, a piece of the original heat transfer flock material 30 is shown as an initial cut from the original roll being substantially rectangular. An area of the initial rectangular heat transfer flock material 30 is cut out using an automatic cutting machine, leaving a recess 36a.

An automatic cutting machine can be used to graphically plot and cut any peripheral shape area design such as the residual piece 36 showing an "ABC" logo while still retaining adhesive 34 and the release liner 30a. In the example herein, the design graphic "ABC" logo could be for an automobile seat. The cutting of the "ABC" logo design in the flock transfer material is typically accomplished through a track or friction feed plotter which also allows cutting through the adhesive down to but not through the release liner and the fibers of the flock material 32. Words, letters, shapes, or numbers are cut through the flock material and the surrounding flock material is "weeded out" or removed from the release liner 30a leaving the desired graphics only. The graphics are cut in reverse because of adhesive 34 so that following application to the car seat, they will read normally.

The surface location where the flock material is to be applied should be pre-cleaned with a solvent such as trichloroethane.

After the flock design is cut (FIG. 3), the next step is manually positioning the graphic design flock material (FIG. 1) to the specific desired location, through measurement, on the car seat surface 12a where the graphic 36 will be permanently mounted, and with the use of straight pins, temporarily attaching the graphic design at the desired position to the seat.

The next step is to place an enlarged 3 mil. thick, flexible teflon glass mesh heat shield material 40 (FIG. 4) over the flock material 36 that has been pinned in place, the shield 40 being large enough in length and width (6" by 6") to overlap the edges of the flock material to protect the flock material surface and the seat fabric from heat damage.

A specially designed hand-held portable heating tool 20 (FIG. 2) is used that has a flat heating surface 22. A hand-held temperature measuring device 24 is manually positioned against the tool surface 22 to determine the surface temperature of the tool surface 22. The tool surface 22 is heated to at least 375° and is then applied to the heat shield 40 in an area of the flock material 36 under light pressure and held in place approximately 10 to 15 seconds at each area location. Once all areas of the flock material have been compressed (through the heat shield 40) with the tool surface 22 in place for the proper amount of heat transfer time, the heat shield teflon glass mesh material 40 is removed. The straight pins can be removed and after the flock material cools down, the release liner 30a can be removed, leaving graphic design 10.

The edges of the flock material design 10 are then checked for any loose fibers or adhesive materials which can be heat treated with the end edge of the tool surface 22 for spot focusing if there are untrimmed edges.

The final step is to brush the texture of the flock material graphic design 10 and the seat fabric 12a around the design to raise the flock.

FIG. 2 shows the tool 20 and voltage regulator 26 used with the present invention to provide the proper heating surface necessary for the heat transfer flock material. In the present application, the tool includes a flat heat transfer surface plate 22 that is a small, predesigned, rectangular surface that has a removable plate 22 that can allow for the use of other transfer surfaces as required. The device includes a protective housing 20a that includes a heating element 21 and a metal shroud 23 enclosing a ceramic fiber blanket 25. The housing 20a is attached to a wooden handle 28. The flat tool head plate 22 heats up based on its thermal mass and in one example may be ⅞ inch in height and 3½ inches in length, is made of brass, and attaches by threading to the housing 20a by circular threaded housing 20b that is threadably attached to threads on housing 20a.

The tool 20 also includes a floor stand 29 to prevent engagement of the heating surface when not in use.

The operational temperature (350° to 380°) of the tool surface is monitored by a thermometer 24 and controlled by a voltage regulator 26 that adjusts the percentage of voltage connected electrically in line with the electrical outlet plug 27 and the heating element 21 attached within the housing 20a.

In an alternate embodiment, each tool head 22 can include a raised engraved design that allows the raised design image to be transferred directly to a fabric, leather, vinyl, or plastic surface through a thermofoil surface.

EXAMPLE 1

An upper portion of a vehicle automobile seat 12 in FIG. 1, having a cloth surface 12a, is selected. A piece of flock material 36 (FIG. 3) is cut in a graphic pattern design and has the letters "ABC" cut in reverse therein using a track or friction fed plotter. The flock material 36 may be approximately 3 to 5 inches in overall length. The cloth surface area 12a to receive the design material is cleaned with a solvent such as trichloroethane to prepare the surface. Measurements are taken to center the exact location where the graphic design material is to be placed. The graphic design material 36 is then mounted to the cloth surface 12a on the seat in the exact location with a plurality of straight pins 11 to hold the material 10 in position. A 3 mil. teflon glass mesh shield material, which is 6 inches by 6 inches, is held in one hand and placed over the graphic design material to be applied. The heating tool 20 is turned on and the heating end plate is heated to a temperature of 380° to 390°, as monitored by the heat sensing device 24 manually positioned against the tool surface 22. Once the temperature of 380° is achieved, the plate surface 22 of the heating device 20 is then applied to the thermal shield 40 in a specific area covering the design material 36 and held there for approximately 12 to 15 seconds to allow for 375° heating on the adhesive for at least 10 seconds. The tool surface 22 is then moved to subsequent adjacent locations of the flock material until the entire graphic flock material has been heated as described at each place for 12 to 15 seconds. Once the heat application is finished, the heat shield material 40 can then be removed, along with the straight pins. The release liner 30a (FIG. 3) on the flock material is then removed, leaving the design graphic 10. If there are any loose edges around the flock material graphic 10, the end of the tool can spot focus for touching specific areas to get rid of loose fibers. The flock material graphic 10 is then brushed, along with the seat material and the job is completed. The flock graphic design 10 is now permanently attached to seat fabric 12a.

The tool head flat surface 22 as shown has been described as being 3½ inches long and ⅞ inch wide, which shows how portable the tool is. Other tool head surfaces of different shapes can be removably attached as desired for different design areas.

The invention is believed to work with any type of cloth, natural or synthetic, and any type of texture weave which allows the adhesive 34 to melt and flow to bond molecularly. Using the present invention, any type of flock material outline design, which includes letters, shaped logos, or numbers can be readily and quickly transferred on site to a cloth surface.

The hand-held temperature analog sensor or thermometer that can measure the plate 22 temperature to insure that proper temperature is achieved could also be accomplished using a digital hand-held temperature sensor that will give the actual digital readout of the temperature of the plate. Typically, the hand-held devices are held against the plate 22 until the proper temperature is achieved. A temperature sensor could be attached or built into the heating tool that also measures the temperature of the flat plate surface as a built-in element.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method for applying a heat transfer flock material to a seat having a cloth surface thereon at any location on site, comprising the steps of:

(a) selecting a seat having a suitable upholstery cloth surface thereon for transferring a graphic flock material design to said cloth surface without removing the cloth surface from said seat;

(b) applying a solvent to clean the cloth surface in the area where the graphic is to be applied;

(c) selecting a suitable graphic heat transfer flock material of a suitable design to be applied to the cloth surface, said flock material comprising fibrous flock material having an adhesive layer backing, and fixing the flock material design in place on the seat surface with a plurality of straight pins;

(d) covering the graphic flock material design and seat with a heat shield barrier, comprising a teflon glass bead sheet;

(e) applying a heated tool to one area of the flock material graphic design through the heat barrier to apply a heated area of approximately 375° for at least 10 seconds, causing the adhesive on the heat flock material to melt and bond with the seat cloth material;

(f) repeating the heat transfer and application to the graphic design in other areas not previously treated, until the entire area of the graphic design has been heat treated to approximately 375° for at least 10 seconds or sufficient time for all of the adhesive to melt and bond to the cloth surface;

(g) whereby the flock material graphic design is permanently affixed to the cloth surface.

2. The method of applying a flock material graphic design to a cloth surface as in claim 1, including the additional step of:

(h) heating any loose edges around the perimeter of the graphic design to eliminate any loose materials for complete bonding around the edge between the graphic design and the cloth surface.

\* \* \* \* \*